United States Patent [19]
Riley et al.

[11] Patent Number: 5,301,279
[45] Date of Patent: Apr. 5, 1994

[54] APPARATUS FOR CONDITIONING PRIORITY ARBITRATION

[75] Inventors: Mack W. Riley, Austin; John D. Upton, Georgetown, both of Tex.

[73] Assignee: International Business Machines Corporation, Armonk, N.Y.

[21] Appl. No.: 982,133

[22] Filed: Nov. 24, 1992

Related U.S. Application Data

[63] Continuation of Ser. No. 451,194, Dec. 15, 1989, abandoned.

[51] Int. Cl.$^5$ .............................................. G06F 13/00
[52] U.S. Cl. .................................. 395/275; 395/250; 395/325; 395/425; 395/725; 364/239.6; 364/242.8; 364/242.3; 364/937.01; 364/941.6; 364/DIG. 2
[58] Field of Search .................... 364/DIG. 1, DIG. 2

[56] References Cited

U.S. PATENT DOCUMENTS

| | | | |
|---|---|---|---|
| 4,228,496 | 10/1980 | Katzman et al. | 364/200 |
| 4,257,095 | 3/1981 | Nadir | 364/200 |
| 4,258,418 | 3/1981 | Heath | 364/200 |
| 4,378,588 | 3/1983 | Katzman et al. | 364/200 |
| 4,470,111 | 9/1984 | Jenkins et al. | 395/275 |
| 4,488,218 | 12/1984 | Grimes | 395/325 |
| 4,602,331 | 7/1986 | Sheth | 364/200 |
| 4,644,463 | 2/1987 | Hotchkin et al. | 364/200 |
| 4,719,563 | 1/1988 | Kosuge et al. | 395/775 |
| 4,809,164 | 2/1989 | Fuller | 364/200 |
| 4,814,762 | 3/1989 | Franaszek | 340/825.79 |

FOREIGN PATENT DOCUMENTS 0384621 9/1990 European Pat. Off. .

OTHER PUBLICATIONS

Multiple Bus DMA Controller, U.S. patent application Ser. No. 303,024 filed Jan. 25, 1989.

*Primary Examiner*—Gareth D. Shaw
*Assistant Examiner*—Lucien Toplu
*Attorney, Agent, or Firm*—David L. McCombs; Paul S. Drake

[57] ABSTRACT

A data processing system including an arrangement for modifying the usual priority arbitration of an input/output channel controller (IOCC) used in granting direct memory access (DMA) service among contending peripheral devices sharing a common peripheral bus. The IOCC includes logic for conditioning the established priority arbitration scheme based upon the data status of the data buffers. If the higher priority requesting device requires a data transfer between the system memory and the IOCC prior to performing an operation directly between the IOCC and the peripheral device, the priority will instead be granted to a lower priority peripheral device that does not require a system memory access operation.

14 Claims, 5 Drawing Sheets

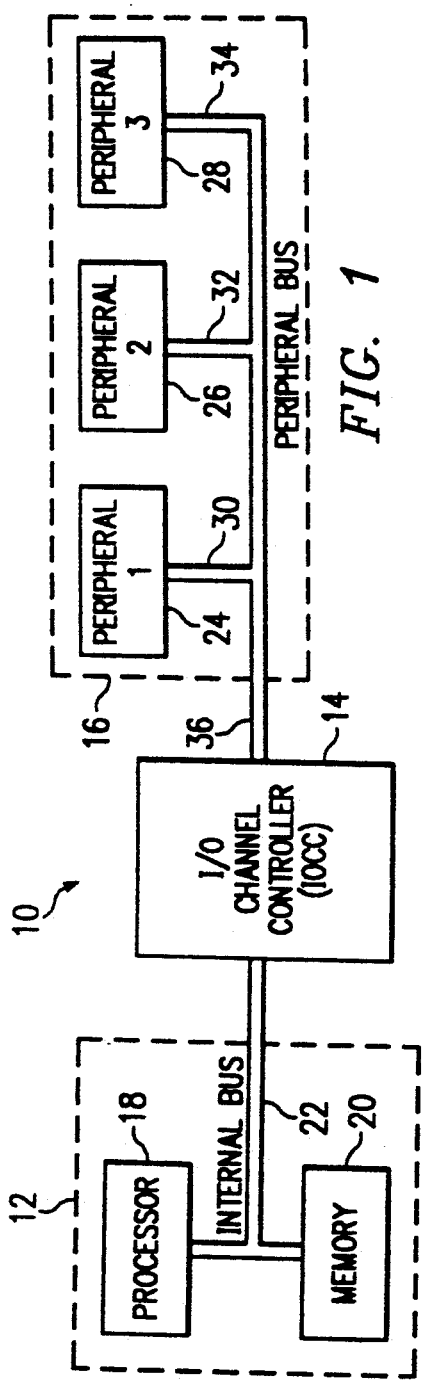
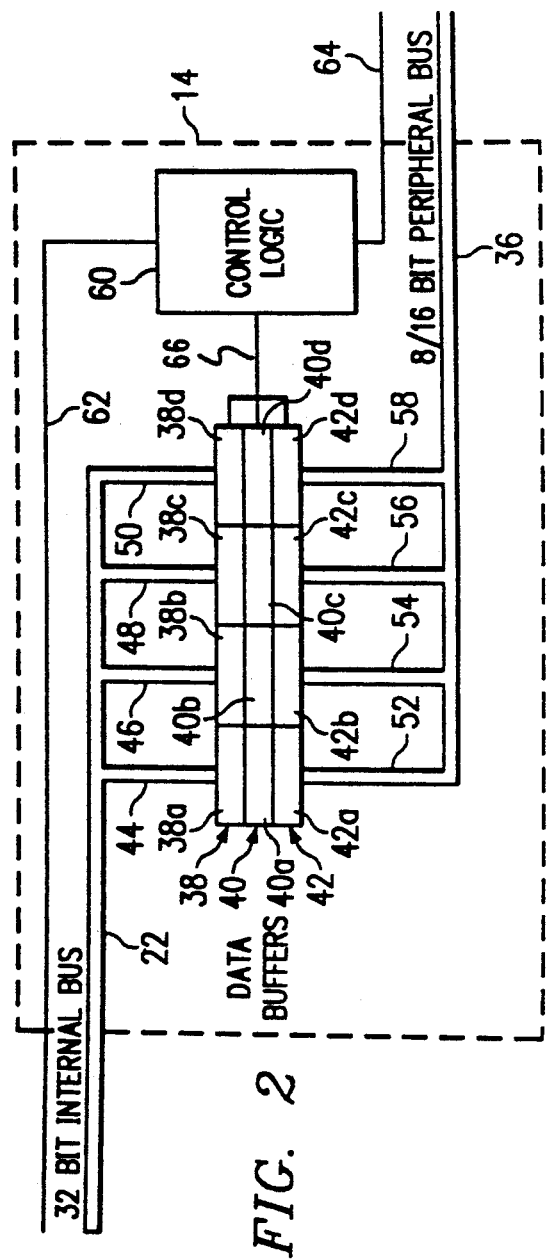

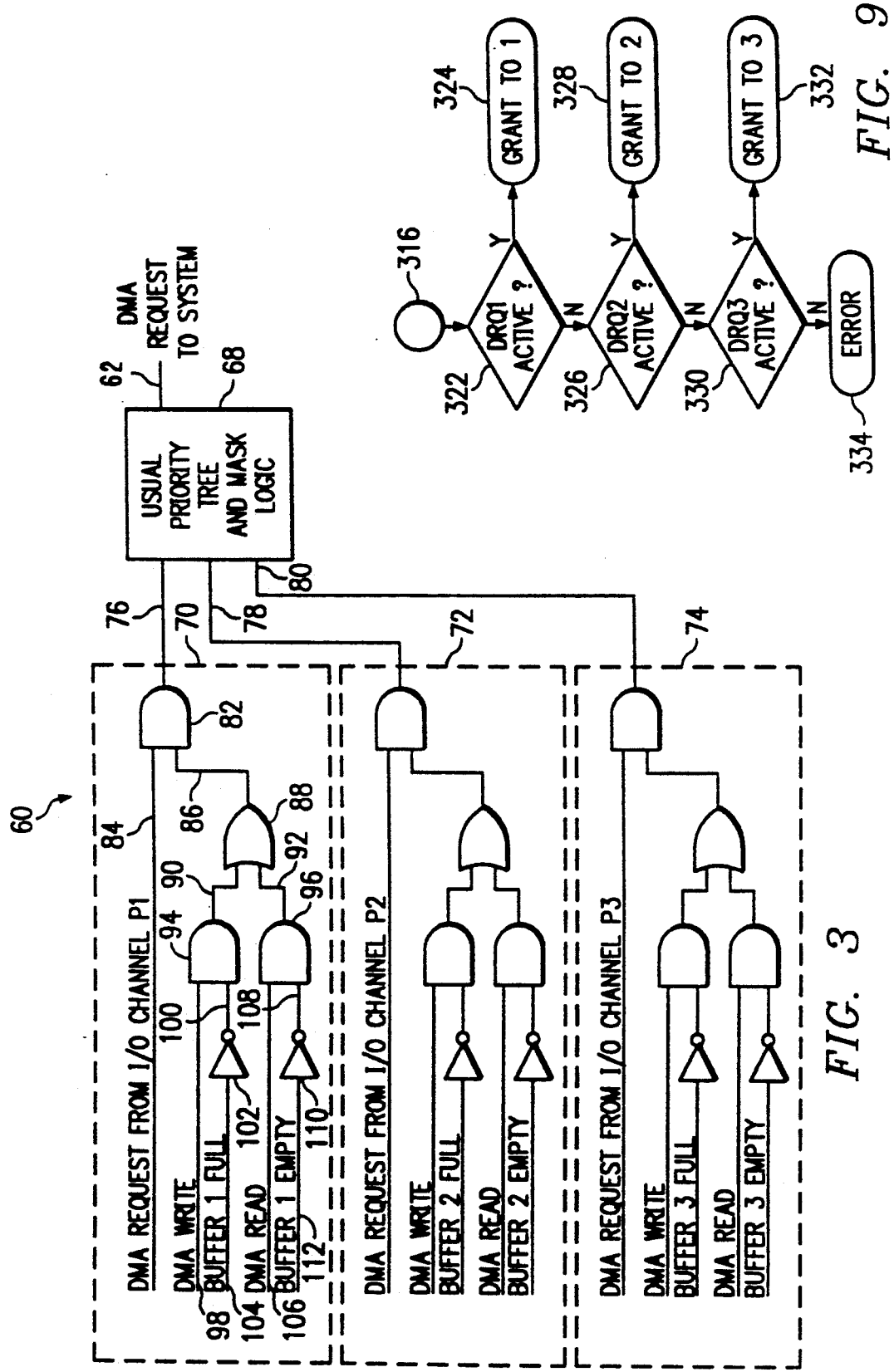

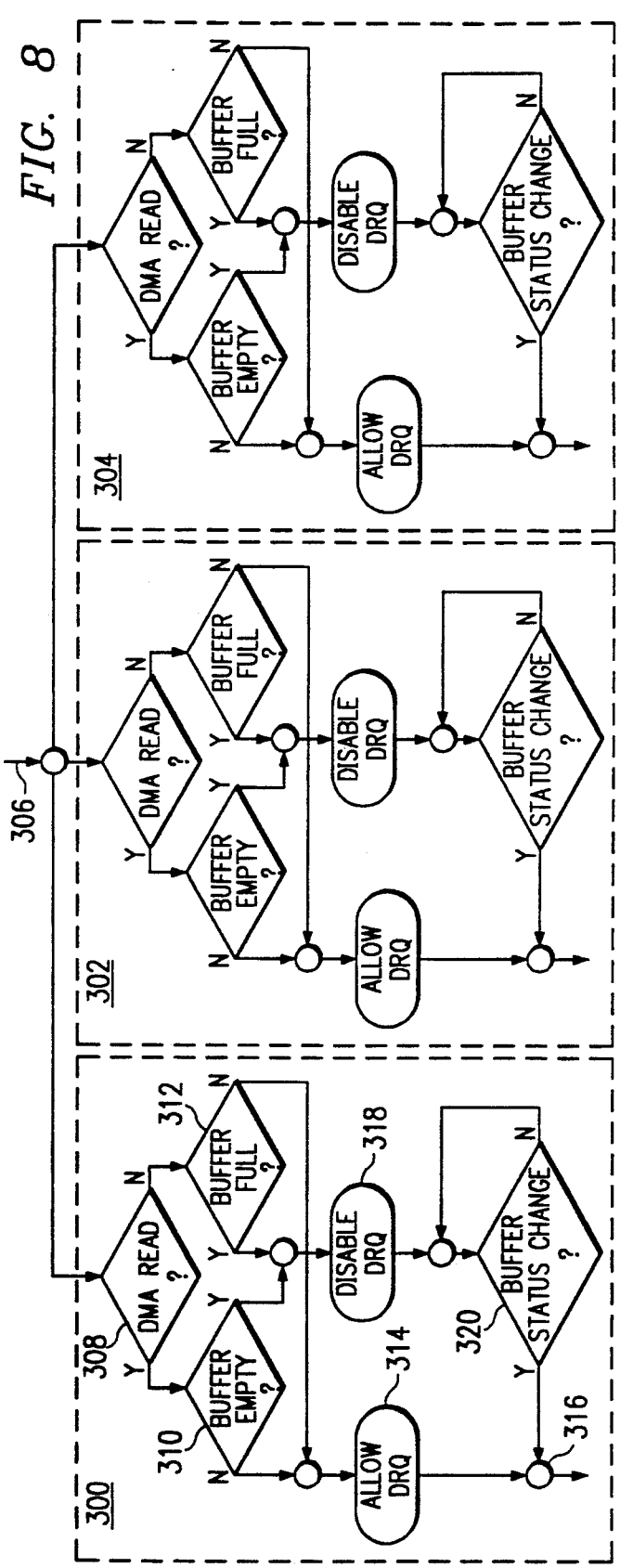

APPARATUS FOR CONDITIONING PRIORITY ARBITRATION

This is a continuation of application Ser. No. 07/451,194 filed Dec. 15, 1989, now abandoned.

CROSS REFERENCE TO RELATED COPENDING APPLICATION

This patent application is related to the copending patent application Ser. No. 303,024, filed Jan. 25, 1989, entitled "MULTIPLE BUS DMA CONTROLLER".

TECHNICAL FIELD

This invention relates in general to data processing systems and, more particularly, to data processing systems connected to multiple peripheral devices.

BACKGROUND ART

Data processing systems typically accomplish the support of a variable number of human or process peripheral devices, including displays, keyboards and external data storage in the form of hard drive or other magnetic disc devices, through standardized I/O electrical channels commonly referred to as buses. The use of a peripheral bus as a common arrangement for connecting the peripheral devices or peripheral parts of a computer system to the processor has provided for system flexibility and has facilitated the adaptability of new peripheral devices and other system enhancements to existing computers. However, performance of these integrated computer systems is limited in one respect by the inability of the relatively simple, low cost peripheral bus to handle concurrent operations as the number of discrete peripherals and their functions increase. Overcommitment of the peripheral bus can lead to the exclusion of operation requests, overload and system failure. Systems in which many devices share a common bus therefore typically utilize schemes for allocating access to the bus under conditions during which a plurality of associated devices may concurrently request access. For example, see U.S. Pat. No. 4,817,037 entitled "Data Processing System With Overlap Bus Cycle Operations." A variety of priority arbitration schemes are known in the art. See *IBM Technical Disclosure Bulletin*, Vol. 17, No. 4, September 1974, entitled "Scheduling an Input/Output Channel Allowing for Committed and/or Uncommitted Device Allocation Requests" and *IBM Technical Disclosure Bulletin*, Vol. 26, No. 2, July 1983, entitled "Selective Processing Enablement for I/O Interruptions".

The function of controlling peripheral devices and allocating channel priority can place significant operational demand on a system, and especially where the speed of operation of the processor is greatly increased relative to that of the peripheral devices, overall efficiency of the data processing system may suffer. As a result, it has been preferred that these control functions be separated from the main processor and assigned to an input/output channel controller (IOCC) which provides the main control interface with the peripheral bus to which any number of different peripheral devices may be attached. The IOCC may be programmed with an appropriate priority arbitration scheme to allocate bus access in accordance with the priority criteria desired.

System efficiency is also greatly improved by giving the IOCC the ability to access memory autonomously without using processor instructions. Direct memory access (DMA) allows an input/output data path or channel to be established between the peripheral devices and system memory, whereby the processor can independently execute instructions or perform operations utilizing other portions of the system memory.

Channel or data buffers are included in the IOCC to enhance DMA performance when there is a mismatch between the amount of information that can be transmitted per cycle between the system memory and the IOCC across an internal bus, and the amount of information that can be transmitted between the IOCC and the peripheral devices across the peripheral bus. For example, an IOCC data buffer with four, one byte locations can be used to accumulate data one or two bytes at a time from a peripheral device over an 8/16-bit peripheral bus into thirty-two (32) bit wide quantities. The contents of the data buffer can then be transferred in a single DMA write, i.e. store, operation through a larger thirty-two (32) bit internal bus to the system memory. When performing DMA read, i.e. load operations from system memory to a peripheral, thirty two bits of information are fetched from the system memory into the data buffer in one operation through the internal bus. The data is then transferred from the buffer one or two bytes at a time to the peripheral device. By reducing the number of cycles or transactions necessary to transfer data between the system memory and the IOCC in both the read and write modes, the data buffer minimizes processor lockout that occurs to handle these transactions, thereby increasing the overall efficiency of the data processing system. More than one data buffer may be provided in the IOCC, each serving as a temporary data storage location for a separate peripheral device. The use of multiple data buffers generally is known and described in U.S. Pat. No. 3,699,530.

A problem associated with data transfer between multiple peripheral devices and system memory in a buffered DMA environment is that a transaction requiring movement of data across both the peripheral bus and the internal bus between the data buffers and the system memory by the IOCC is a relatively slow operation compared to the normal peripheral channel data operations taking place across the peripheral bus. The result is that any DMA transaction which requires a system memory access will be slower than one which operates completely out of the data buffers. The length of the transaction is increased by the need to perform two channel arbitrations; the first to gain control of the peripheral bus and the second to gain control of the internal bus. Valuable peripheral bus bandwidth is thereby wasted for DMA transactions that include a lengthy system memory operation on the data buffer while a faster transaction for a lower priority peripheral device must wait for access to the peripheral bus.

It is an object of the present invention to provide an improved data processing system in which direct memory access between a number of peripheral devices sharing a common peripheral bus and a system memory device is accomplished by an input/output channel controller (IOCC) having data buffers.

It is a further object of the present invention to provide a data processing system of the above type in which a method and apparatus is provided for enhancing DMA performance by optimizing the transaction availability of the peripheral bus.

It is a still further object of the present invention to provide a data processing system of the above type in which the established priority arbitration scheme for granting access to the peripheral bus among contending peripheral devices is conditioned according to the data status of the data buffer to be accessed.

DISCLOSURE OF THE INVENTION

Toward fulfillment of these and other objects, a data processing system of the present invention includes an arrangement for modifying the usual priority arbitration of the IOCC used in granting data transfer requests among contending peripheral devices sharing the peripheral bus. Utilization of the peripheral bus is improved by conditioning the established arbitration priority scheme based upon the data status of the data buffer so that if the normally higher priority requesting peripheral device requires a data transfer between the buffer and the system memory, priority will instead be granted to a lower priority device that does not require the relatively time consuming system memory access operation. In this manner, lower priority peripheral device with valid data in its buffer during a DMA read transaction or empty buffer space during a DMA write transaction will temporarily be given priority for use of the peripheral bus over other normally higher priority peripheral devices which do not yet have data or buffer space available. While the lower priority transaction is taking place across the peripheral bus, the required system memory access operation for the higher priority peripheral device is accomplished. This concurrency causes the system to always appear to be operating out of the data buffers by allowing the faster transactions across the peripheral bus to proceed while the slower buffer to main memory operations are completing.

In a preferred embodiment of the present invention the IOCC is provided with a digital logic circuit for determining when the data buffer to be accessed is either full or empty for conditioning the established priority during DMA write and DMA read transactions, respectively.

These and other objects, features and advantages of the invention will be apparent from the following, more particular description of the preferred embodiment of the invention as illustrated in the accompanying drawings.

BRIEF DESCRIPTION OF THE DRAWINGS

The novel features believed characteristic of the invention are set forth in the appended claims. The invention itself, however, as well as other features and advantages thereof, will best be understood by reference to the following description of the preferred embodiment, when read in conjunction with the accompanying figures, wherein:

FIG. 1 is a block diagram of a data processing system involving the present invention;

FIG. 2 is a block diagram illustrating the data buffers and control logic of the input/output channel controller (IOCC) shown in FIG. 1;

FIG. 3 is schematic view of the control logic shown in FIG. 2 employed for modifying the usual priority arbitration of the IOCC;

FIG. 8 is a flow chart of the conditioning sequence provided by the present invention for modifying a priority arbitration scheme to grant DMA service to one among contending peripheral devices o the data processing system of FIG. 1;

FIG. 9 is a flow chart showing a linear priority arbitration scheme for granting DMA service to one among contending peripheral devices of the data processing system of FIG. 1; and, FIG. 10 is a table illustrating operation of the data processing system of FIG. 1 where the priority arbitration scheme at times is modified to grant DMA service to a lower priority contending peripheral device.

BEST MODE FOR CARRYING OUT THE INVENTION

Figure 4:
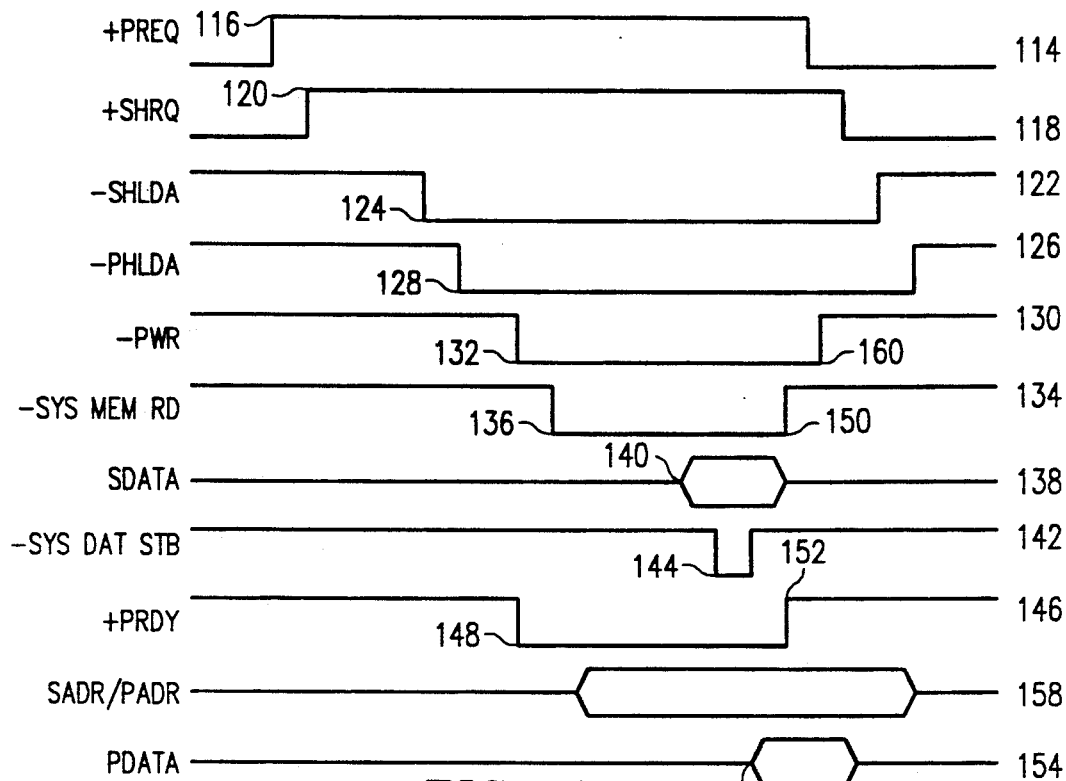
FIG. 4 is a timing diagram illustrating a DMA read operation for the system shown in FIG. 1 without the conditioning provided by the present invention where system memory access is required.

Referring to FIG. 1 of the drawings, the reference numeral 10 refers to a data processing system which includes a processor complex 12, an input/output channel controller (IOCC) 14 and an input/output subsystem 16. A processor 18 and a system memory 20 comprise the processor complex 12 and are interconnected by an internal bus 22. The internal bus 22 is also connected to the IOCC 14. The input/output subsystem 16 includes peripheral devices 24, 26 and 28 which are attached in a conventional manner to ports 30, 32 and 34, respectively, on a peripheral bus 36. The peripheral bus 36 is also connected to the IOCC 14.

It is understood that the components of the processor complex 12 and at least a portion of the IOCC 14 may be embodied as separate integrated circuit modules which are mounted on a conventional printed circuit card (not shown) and the remainder of the components of the system 10 may be packaged with the system board electronics of the IBM RT PC Work Station (also not shown). While three peripheral devices 24, 26 and 28 are provided for purposes of illustration herein, it is understood that any number of peripheral devices may share the common peripheral bus 36. The peripheral devices may consist of, for example, displays, disc drives, network cards and printers, etc.

The internal bus 22 is a high bandwidth synchronous bus designed to interconnect the processor 18, the system memory 20 and the IOCC 14. The internal bus 22 is a package switching bus transfering information (multiplexed address and data) in thirty-two (32) bit wide quantities. The protocol functions of the bus 22 may include, inter alia, parity check, request, and acknowledge sequences to ensure data transfer integrity. The peripheral bus 36 is an economical, lower performance bus which comprises address, data and control lines, the data lines of which are sixteen (16) bits wide. The bus 36 generally has the bus architecture of the standard IBM PC AT type.

Since the protocol of the peripheral bus 36 is much less sophisticated and its transfer operations are clocked differently than on the internal bus 22, an important function of the IOCC 14 is to act as an interface for the transfer of data between the internal bus and the peripheral bus. In operation of the IOCC 14, for example, status information and clock information from the internal bus 22 is utilized by the IOCC to generate appropriate signals for the peripheral bus 36 which will result in either a read or a write signal accompanied by address and data signals. The IOCC 14 performs address translation of data transferred across the peripheral bus 36 to allow communication of the peripheral devices with the processor complex 12 in virtual mode. It is understood that this is a bidirectional process.

An important function of the IOCC 14 is to process requests for direct memory access (DMA) service between the peripheral devices 24, 26 and 28 and the processor complex 12. In contrast, a programmed input/output (PIO) instruction requires execution by the processor 18 such that communications with the peripheral device may be slower than desired. In addition, when executing PIO instructions the processor 18 cannot be used concurrently for other operations while it is providing support for the peripheral device. The performance of DMA transactions do not require direct step-by-step supervision by the processor 18 and allow for rapid and efficient mass data transfers between the system memory 20 and the peripheral devices 24, 26 and 28.

Schematically shown in FIG. 2 is a portion of the architecture of the IOCC 14 which uses hardware data buffers 38, 40 and 42 to enhance DMA performance. Each of the data buffers 38, 40 and 42 are used to accumulate and temporarily store data in thirty-two (32) bit wide quantities for transfers between the respective peripheral devices 24, 26 and 28 and the processor complex 12. While only three data buffers are shown, it is understood that additional data buffers may be provided corresponding to the number of peripheral devices sharing the peripheral bus 36. The data buffers 38, 40 and 42 each contain four temporary memory locations represented by the suffixes a, b, c and d, each of which are capable of storing 8 bits of information. Four lines 44, 46, 48 and 50, connect the respective locations a, b, c and d of each of the buffers 38, 40 and 42 to the internal bus 22. It is understood that the lines 44-50 are consecutive and carry eight signal lines each (not shown) for the transfer of data in thirty-two (32) bit wide quantities into and out of the data buffers 38-42 across the internal bus 22. Another four lines 52, 54, 56 and 58 connect the peripheral bus 36 to the respective locations a-d of each of the data buffers 38-42. The lines 52 and 56 are consecutive signal lines and carry eight signal lines each (also not shown) for the transfer of data in eight (8) bit wide quantities into and out of the locations a and/or c of the data buffers 38-42 across the peripheral bus 36. In the same manner, the lines 54 and 58 are also consecutive signal transferring data in eight (8) bit wide quantities into and out of the locations b and/or d of the data buffers 38-42 across the peripheral bus 36. According to this arrangement, it is also apparent that data may be transferred on the lines 52-58 in sixteen (16) bit wide quantities into and out of the locations a and b or c and d of the data buffers 38-42 on the peripheral bus 36.

Thus, the data buffers 38, 40 and 42 provide an interface function which improves the performance of the system 10 by reducing the demand on the internal bus 22. For example, when a DMA write operation is to be performed, the IOCC 14 must transfer data from one of the peripheral devices 24, 26 or 28 to a storage location in the system memory 20. Information is transferred one or two bytes at a time from the peripheral device across the peripheral bus 36 and accumulated over two or four cycles of operation into the locations a-d of the appropriate data buffer 38, 40 or 42. Only once the subject data buffer is full (i.e., each location a-d contains data) will access to the internal bus 22 be granted. A thirty two (32) bit wide transfer of data will then occur in a single write operation to the system memory 20 from the data buffer across the internal bus 22. When performing a DMA read, i.e. load operation from the system memory 20 to a peripheral device, thirty-two (32) bits of information are transferred in a single read operation across the internal bus 22 and temporarily stored in the data buffer corresponding to the particular peripheral device. Data may then be read out of the locations a-d of the data buffer and transferred across the peripheral bus 36 in either eight (8) or sixteen (16) bit quantities to the peripheral device over either four or two operation cycles. When data is read out of the locations a-d of the data buffer to the peripheral device, the transfer operations are transparent to the internal bus 22 and the processor complex 12.

The control logic circuitry of the IOCC 14 is represented by block 60 in FIG. 2 and provides for the management of DMA transfers between the peripheral devices 24, 26 and 28 and the processor complex 12 through the data buffers 38-42 of the IOCC. The circuitry of the control logic block 60 provides for priority arbitration among two or more of the peripheral devices 24, 26 or 28 which may be simultaneously requesting access to the peripheral bus 36 for DMA service. The control logic block 60 further improves utilization of the peripheral bus 36 by conditioning or modifying the usual priority arbitration, based upon the data status of the data buffers 38, 40 and 42. The priority arbitration scheme and conditioning circuitry of the control logic block 60 are discussed subsequently in detail. A control line 62 is connected to the control logic block 60 and represents the transfer of system level DMA request and protocol signals from the IOCC 14 to the processor complex 12. A control line 64 is also connected to the control logic block 60 and represents the transfer of DMA request and protocol signals between the IOCC 14 and the peripheral devices 24, 26 and 28. Line 66 connects each of the data buffers 38, 40 and 42 to the control logic block 60.

Referring now to FIG. 3, there is depicted in greater detail the control logic circuitry of the block 60 from FIG. 2. Block 68 represents the priority arbitration scheme for determining which among contending ones of the peripheral devices 24, 26 and 28 will be granted DMA service and therefore access to the peripheral bus 36. The priority arbitration block 68 is connected by the line 64 to the processor complex 12 (FIG. 1). In the preferred embodiment, a linear priority arbitration scheme is provided by the block 68 which is subsequently described with reference to the flow chart in FIG. 9.

According to the present invention, blocks 70, 72 and 74 comprise the conditioning circuitry for modifying the usual priority arbitration scheme used in granting data transfer requests among the peripheral devices 24, 26 and 28, respectively, which may be contending for DMA service. As will be discussed in detail, the conditioning blocks 70, 72 and 74 modify the usual priority to maximize the utilization of the peripheral bus 36 based on the availability or data status of the data buffers 38, 40 and 42, respectively. Lines 76, 78 and 80 connect the priority arbitration block 68 to the conditioning blocks 70, 72 and 74, respectively. Since the components of each of the conditioning blocks 70, 72 and 74 are identical, only the conditioning block 70 will be described.

The control logic of the conditioning block 70 includes an AND gate 82 connected at its input to a DMA request line 84. The DMA request line 84 carries signal requests for DMA service to the block 70 from the peripheral device 24 (FIG. 1). A buffer status line 86 is also connected to the input of the AND gate 82. An OR gate 88 is connected at its output to the buffer status line 86. Lines 90 and 92 are connected to the input of the OR gate 88. AND gates 94 and 96 are connected at their output to the lines 90 and 92, respectively. A DMA write line 98 is connected to the input of the AND gate 94. Also connected to the input of the AND gate 94 is a line 100. An inverter 102 is connected at its output to the line 100. A buffer full line 104 from the data buffer 38 (FIG. 2) is connected to the input of the inverter 102. A DMA read line 106 is connected to the input of the AND gate 96. Also connected to the input of the AND gate 96 is a line 108. An inverter 110 is connected at its output to the line 108. A buffer empty line 112 from the data buffer 38 is connected to the input of the inverter 110.

In operation of the system 10, more than one of the peripheral devices 24, 26 and 28 (FIG. 1) residing on the demand shared peripheral bus 36 may request DMA service simultaneously. Since only one of the peripheral devices can have access to the peripheral bus 36 at a given time, the priority arbitration block 68 (FIG. 3) receiving contending DMA request signals (across two or more of the lines 76, 78 and 80) will grant a request for DMA service to the higher priority of the requesting peripheral devices. In the preferred embodiment, block 68 implements a linear priority arbitration scheme in which the peripheral device 24 has the highest priority, the peripheral device 26 has the next priority, and the peripheral device 28 has the lowest priority. The DMA service request(s) of the lower priority contending peripheral device(s) will be held off until the DMA operation for the higher priority peripheral device is completed.

As previously described, inefficient utilization of the peripheral bus 36 occurs at times when the higher priority of the contending peripheral devices requires a system memory operation across the internal bus 22 before the operation across the peripheral bus can occur. The peripheral bus 36 is "held waiting" when instead it could be utilized by a lower priority device that is capable of operating completely out of its data buffer 40 or 42 (FIG. 2). The foregoing occurs during a DMA write operation when the particular data buffer for the higher priority peripheral device is full since data must first be transferred in a single, thirty two (32) bit wide quantity across the internal bus 22 to the system memory 20 (FIG. 1) before the data buffer locations a-d can receive data across the peripheral bus in 8 or 16 bit quantities from the peripheral device. Similarly, during a DMA read operation when the data buffer for the higher priority peripheral device is empty, information must first be transferred from the system memory 20 across the internal bus 22 in a thirty two (32) bit wide quantity to the data buffer, before it can be transferred one or two bytes at a time across the peripheral bus 36 from the channel buffer locations a-d to the active peripheral device.

Accordingly, the conditioning system of the present invention renders the usual priority arbitration adaptive according to the data status condition of the data buffers 38, 40 and 42. If the higher priority peripheral device is requesting a DMA write operation and its data buffer is full, or alternatively is requesting a DMA read operation and its data buffer is empty, the conditioning block 70, 72 or 74 (FIG. 3) for the device will not forward an active signal request for DMA service to the priority arbitration block 68 and the request will instead be granted to the next ranked contending peripheral device which does not require a system memory operation.

For example, the operation of the conditioning logic is now described with reference to the conditioning block 70 in FIG. 3. A request for DMA service by the peripheral device 24 (FIG. 1) provides an active signal to the AND gate 82 on the DMA request line 84. Only if the buffer status line 86 also provides an active signal to the AND gate 82 will the conditioning block 70 forward an active DMA request signal on the line 76 to the priority arbitration block 68. Alternatively, if the buffer status line 86 is inactive, the signal output of the conditioning block 70 on the line 76 will also be inactive and the DMA service request for the peripheral device 24 will be held off. In this manner, the priority arbitration will be modified so that the next lower priority peripheral device (e.g., the device 26 or the device 28) may instead be granted access to the peripheral bus 36.

If a DMA write operation is requested by the peripheral device 24, the DMA write line 98 will provide an active signal to the AND gate 94. If the data buffer 38 (FIG. 2) is not full and has one or more empty locations 38a-d, the signal across the buffer full line 104 to the inverter 102 will be inactive. The output or the inverter 102 will produce an active signal across the line 100 to the AND gate 94. The output of the AND gate 94 and thus the OR gate 88 will provide an active signal on the buffer status line 86 to the AND gate 82. Thus, an active signal from the conditioning block 70 on the line 76 from the conditioning block 70 to the block 68 will result in the implementation of the usual priority arbitration scheme in which the peripheral device 24 will be granted DMA service.

On the other hand, if the peripheral device 24 is requesting a DMA write operation and the data buffer 38 (FIG. 2) is full, an active signal will be provided to the inverter 102 on the buffer full line 104. The output of the inverter 102 will then forward an inactive signal to the AND gate 94. The output of the AND gate 94 and consequently the OR gate 88 will be an inactive signal to the buffer status line 86. The AND gate 82 will provide an inactive signal to the priority arbitration block 70 on the line 76. Thus, the peripheral device 24 will not be granted DMA service. The next lower priority device requesting DMA service with valid data (for a DMA read) or buffer space available (for a DMA write) will instead be granted access to the peripheral bus 36. While the next lower priority peripheral device is utilizing the peripheral bus 36, the full data buffer 38 will concurrently perform its data transfer operation on the internal bus 22 to the system memory 20 (FIG. 1).

In a similar manner, the conditioning logic of the conditioning block 70 determines whether the peripheral device 24 should follow the usual priority arbitration scheme during a DMA read operation. During a DMA read operation, the DMA read line 106 will provide an active signal to the AND gate 96. If the data buffer 38 contains data in at least one of the locations 38a-d, an inactive signal on the buffer empty line 112 will cause the inverter 110 to provide an active signal to the AND gate 96 and hence an active signal to the OR gate 88. The signal output of the AND gate 82 on the line 76 will be active. The normal priority arbitration scheme will be followed and the peripheral device 24 will be granted DMA service. Alternatively, if the data buffer 38 is empty, an active signal on the buffer empty line 112 is provided to the inverter 110 resulting in an inactive signal to the AND gate 96 and the OR gate 88. The AND gate 82 will provide an inactive signal on the line 76 to the block 68. The usual priority arbitration is therefore modified and a lower priority peripheral device is granted access to the peripheral bus 36. While the lower priority device is performing its data transfer operation on the peripheral bus 36, thirty-two (32) bits of data are concurrently transferred from the system memory 20 to the data buffer 38 across the internal bus 22.

FIGS. 4-7 are timing diagrams illustrating the timing of information transfers for the system 10 which may occur between any one of the peripheral devices 24, 26 and 28, the IOCC 14 and the processor complex 12. It is understood that lines which are described as carrying signals between the processor complex 12 and the IOCC 14 correspond in FIG. 2 to the control line 62, while lines carrying signals between the peripheral devices and the IOCC correspond to the control line 64. The remaining lines carry signals internal to the IOCC.

FIG. 4 depicts the timing for a DMA read operation absent the conditioning logic of the present invention where data is to be transferred from the system memory 20 to a particular peripheral device and the data buffer corresponding to the peripheral device is empty. Line 114 carries an active +PREQ (peripheral request) signal at time 116 from the peripheral device requesting DMA service to the IOCC 14. On line 118 a +SHRQ (system hold request) signal is activated at time 120 by which the IOCC 14 (through a similar protocol) requests DMA service to the processor complex 12. A −SHLDA (system hold acknowledge) signal on line 122 is then activated at time 124 whereby the processor complex 12 acnowledges the +SHRQ signal to the IOCC 14 indicating that it now has access to the internal bus 22. Line 126 represents a −PHLDA (peripheral hold acknowledge) signal which is activated at time 128 and generated from the IOCC 14 to the peripheral device acknowledging the grant of the peripheral bus 36 access. Since the peripheral bus 36 is now in a state where data transfer may commence, line 130 within the IOCC 14 provides a −PWR (peripheral write) signal which is a write strobe for the peripheral device. The −PWR signal is activated at time 132 to start the operation.

Before information can be written from the channel buffer to the peripheral device, 32 bits of information must first be read from the memory 20 into the channel buffer across the internal bus 22. As indicated by line 134, a −SYS MEM RD (system memory read) signal between the IOCC 14 and the processor complex 12 is activated at time 136 indicating that the IOCC is now ready to read information from the system memory 20. As shown by line 138, data is transferred from the system memory 20 to the data buffer according to an SDATA (system data) signal at time 140. A SYS DAT STB (system data strobe) signal on line 142 latches the data read from the system memory 20 into the channel buffer at time 144. The −SYS DAT STB signal is generated internal to the IOCC 14 and is a timing signal that allows the control logic to store the data in the buffers.

While the above data transfer from the system memory 20 to the channel buffer is completing, the writing of data across the peripheral bus 36 from the channel buffer to the peripheral device cannot yet take place, even though the peripheral device has been standing ready since the time 132 when the −PWR signal on the line 130 went active. A +PRDY (peripheral ready) signal as shown on line 146 is made inactive at time 148 shortly after the time 132. As long as the +PRDY signal is inactive, the peripheral device is held waiting for the transfer of data across the peripheral bus 36. Once the data from the system memory 20 is latched into the channel buffer as shown on the line 142 and the transfer of data from the system memory 20 to the data buffer is complete, the −SYS MEM RD signal on the line 134 is released to the normal state at time 150. The +PRDY signal on the line 146 is also released to the normal state at time 152. Line 154 represents the transfer of data out of the channel buffer to the peripheral device according to a PDATA (peripheral data) signal at time 156. An appropriate address location in either the system memory 20 or the peripheral device required for the transfer of data is indicated by line 158 which carries a SADR/PADR (system address/peripheral address) signal. The data is latched into the peripheral device from the IOCC 14 at time 160 on the line 130 when the PWR signal goes inactive.

Figure 5:
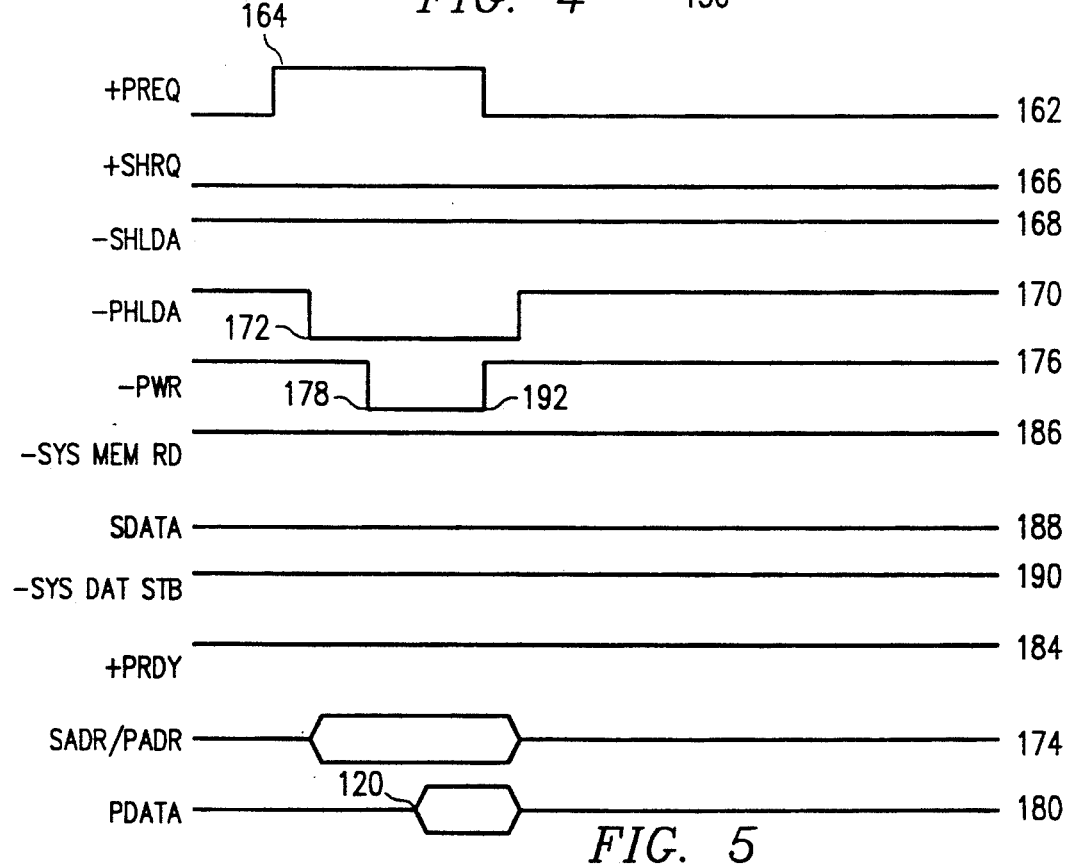
FIG. 5 is a timing diagram illustrating a DMA read operation for the system shown in FIG. 1 where the conditioning provided by the present invention grants DMA service to a peripheral device in which no system memory access is required.

Referring to FIG. 5, the timing of the system 10 is illustrated showing how utilization of the peripheral bus is improved by the data status conditioning of the present invention for a DMA read operation where the peripheral device which is granted DMA service will never require a system memory operation. On line 162 a +PREQ (peripheral request) signal is activated at time 164. Since access to the processor complex 12 is not required to fill the channel buffer, lines 166 and 168 which carry +SHRQ (system hold request) and −SHLDA (system hold acknowledge) signals remain in their normal states. On line 170, the IOCC 14 grants a −PHLDA (peripheral hold acknowledge) signal to the peripheral device which goes active at time 172 indicating that the peripheral device has access to the peripheral bus 36. As shown on line 174, the IOCC 14 will provide appropriate address instructions as indicated by a SADR/PADR signal on the line 174. On line 176 a −PWR (peripheral write) signal is activated at time 178. Since the data for transfer is held locally in the data buffer, the IOCC on line 180 will activate a PDATA (peripheral data) signal at time 120 for transfer of data across the peripheral bus 36.

Since the transfer operation occurs locally between the peripheral device and the data buffer of the IOCC 14, it was not necessary to inactivate a +PRDY (peripheral ready) signal on line 184 to hold the peripheral device waiting while a data transfer across the internal bus 22 to the IOCC 14 occurred. Consequently, since there was no data transfer across the internal bus 22, lines 186, 188 and 190 (which carry −SYS MEM RD, SDATA, and −SYS DAT STB signals, respectively) remain in their normal states. The next event occurs at time 192 on the line 176 when the −PWR signal goes to the normal state. This causes the data to be latched or written by the peripheral device, completing the DMA cycle.

Figure 6:
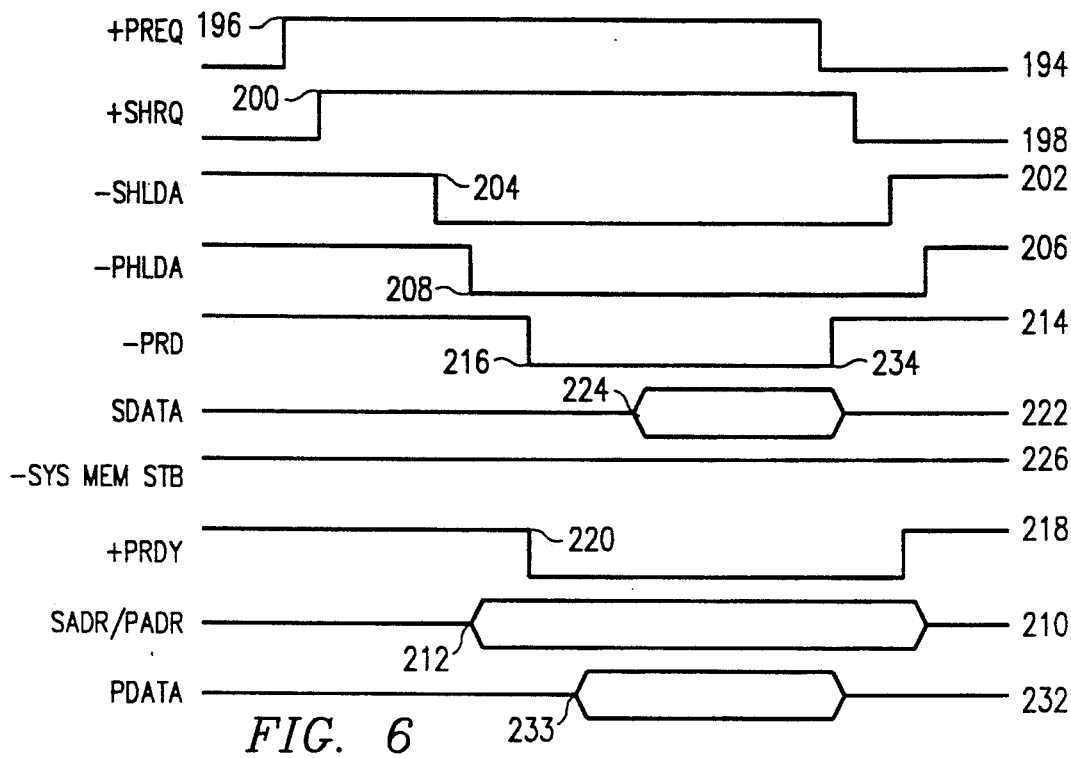
FIG. 6 is a timing diagram illustrating a DMA write operation for the system shown in FIG. 1 without the conditioning provided by the present invention where system memory access is required.

Referring to FIG. 6, the timing diagram shows a DMA write operation showing the sequence of events which occur without the conditiong logic of the present invention to modify the DMA service priority for a peripheral device with a full channel buffer. Line 194 shows the activation of a +PREQ (peripheral request) signal at time 196 indicating the initiation of a request for DMA service by a peripheral device. This event would in turn cause the IOCC 14 to activate a +SHRQ (system hold request) signal on line 198 to the system complex 12 at time 200. On line 203 the processor complex 12 would activate a −SHLDA signal at time 204. The IOCC then activates a −PHLDA (peripheral hold acknowledge) signal on line 206 at time 208. The peripheral device is now ready to start the DMA cycle, and, as shown on line 210, an appropriate SADR-/PADR (system address/peripheral address) signal is provided as shown at time 212. Line 214 activates a −PRD (peripheral read) signal at time 216 indicating that the data transfer across the peripheral bus is ready to commence. Concurrently, on line 218, a +PRDY (peripheral ready) signal is inactivated at time 220 because the peripheral device is required to wait until a transfer of data across the internal bus 22 has occurred before there is space to transfer data across the peripheral bus 36 into the channel buffer. On line 222, a transfer of data from the data buffer across the internal bus 22 to the system memory 20 is indicated according to an SDATA (system data) signal commencing at time 224. Accordingly, on line 226, a −SYS MEM STB (system memory strobe) line is activated at time 228 to start the process of latching the information to the system memory 20. Once this is completed, the +PRDY (peripheral ready) signal on the line 218 is activated at time 230. Data on line 232 is transferred according to a PDATA (peripheral data) signal at time 233. The data becomes latched after time 234 on the line 214 when the −PRD signal is inactivated.

Figure 7:
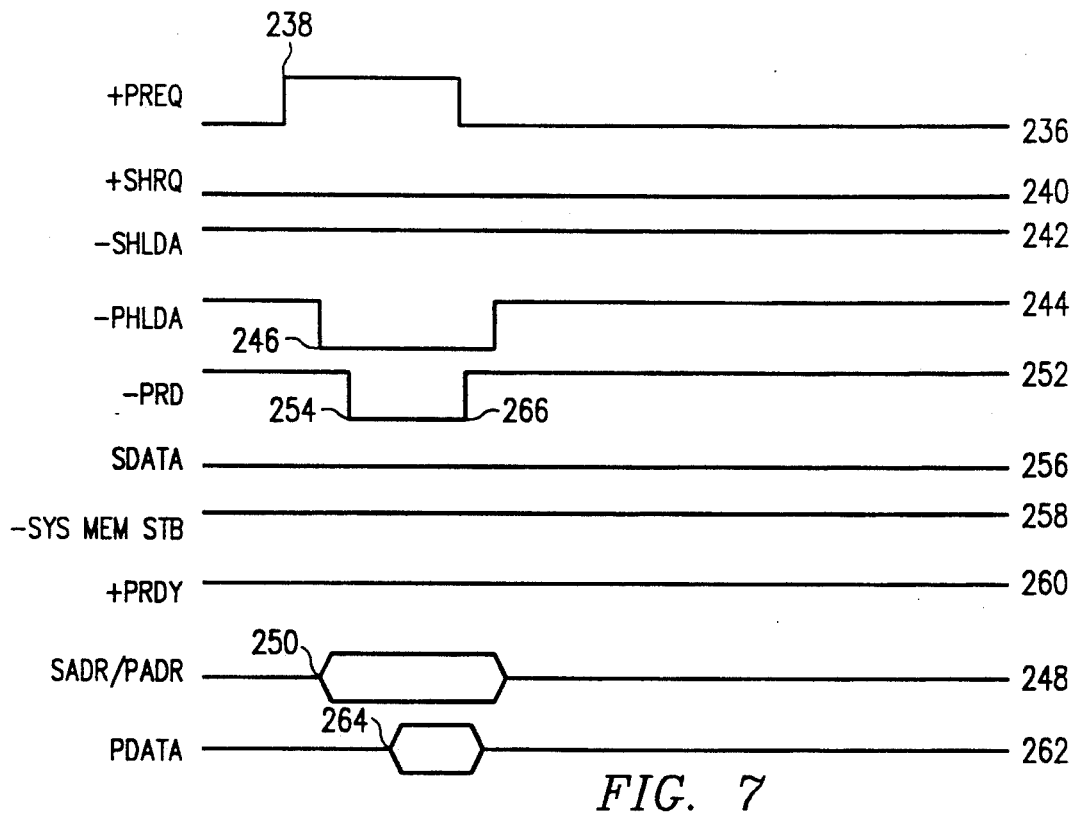
FIG. 7 is a timing diagram illustrating a DMA write operation for the system shown in FIG. 1 where the conditioning provided by the present invention grants DMA service to a peripheral device in which no system memory access is required.

FIG. 7 illustrates the timing for a DMA write operation for a conditioned peripheral device where the data buffer is never full and information may be read from the peripheral device into the data buffer without a system memory operation. On line 236 a peripheral device requests DMA service with an active +PREQ (peripheral request) signal at time 238. Since this is a local transfer to the IOCC 14 from the peripheral device, there will not be a system request made so that lines 240 and 242 (+SHRQ and −SHLDA signals) remain in their normal states. The IOCC in turn determines that space is available in the channel buffer to transfer data from the peripheral device. On line 244, a −PHLDA (peripheral hold acknowledge) signal is activated at time 246. Line 248 provides an appropriate address according to a SADR/PADR (system address/peripheral address) signal at time 250. Line 252 shows that a −PRD (peripheral read) signal is then activated at time 254 indicating that data may be placed on the peripheral bus 36. Since no system memory operation takes place, lines 256, 258 and 260 which represent SDATA, −SYS MEM STB, and +PRDY signals, respectively, remain in their normal states. Thus, as shown on line 262 the peripheral device will start putting data on the peripheral bus 36 as shown by a PDATA signal which is valid at time 264. At the rising edge of the −PRD signal which is inactivated at time 266 on the line 252, the data is latched into the buffer from the peripheral device.

FIG. 8 is a flow chart of the system of the present invention for modifying or conditioning a priority arbitration scheme. In the preferred embodiment, the priority arbitration scheme to be conditioned is the linear arbitration scheme described subsequently in FIG. 9. Each branch of the flow chart represented by blocks 300, 302 and 304 correspond respectively to the conditioning blocks 70, 72 and 74 of the hardware implementation shown in FIG. 3. Since the sequence of events for each of the blocks 300, 302 and 304 are identical, only the details of block 300 will be described.

The conditioning system starts at step 306 when a request for DMA service from the peripheral device 24 enters a DMA READ decision block 308. The DMA READ decision block 308 determines whether the request is for a DMA read or DMA write operation. A BUFFER EMPTY decision block 310 receives the request if a DMA read operation is to occur. Alternatively, a BUFFER FULL decision block 312 receives the request if a DMA write operation is to occur. The BUFFER EMPTY decision block 310 determines the data status of the data buffer 38 (FIG. 2) to the extent that if data is present in one or more of the locations 38a-d, the request will proceed to an ALLOW DRQ block 314. The ALLOW DRQ block 314 passes the request to step 316 whereby the request then is subject to the usual priority arbitration scheme, subsequently illustrated by the flow chart in FIG. 9.

If the BUFFER EMPTY decision block 310 instead determines that there is no data in the data buffer 38, the request proceeds to a DISABLE DRQ block 318. The DISABLE DRQ block 318 operates to prevent the request from proceeding to the step 316. A BUFFER STATUS CHG decision block 320 receives the request from the DISABLE DRQ block 318 and only if the data status of the buffer 38 changes (in this case, by adding data to the locations 38a-d from the system memory 20) will the the request be allowed to proceed to the step 316.

As previously mentioned, the DMA READ decision block 308 will forward a request for DMA service to the BUFFER FULL decision block 312 when the request is for a DMA write operation. The BUFFER FULL decision block 312 will determine the data status of the data buffer 38 to the extent that if data is not present in all of the locations 38a-d, the request will be forwarded to the ALLOW DRQ block 314 The request will then proceed to the step 316 for normal priority arbitration (subsequently discussed). However, if the data buffer 38 has data in all of its locations 38a-d, the request proceeds to the DISABLE DRQ block 318. Only once the data status changes by removal of data from the locations 38a-d will the DATA STATUS CHG decision block 320 allow the request to proceed to the step 316.

FIG. 9 is a flow chart of the priority arbitration scheme of the present invention corresponding to the operation of the priority arbitration block 68 of FIG. 3. The priority arbitration is a linear scheme which grants DMA service to the highest ranking among contending peripheral devices for allocating access to the peripheral bus 36. A request for DMA Service at the step 316 (from FIG. 8) proceeds to a DRQ1 ACTIVE decision block 322. If the request corresponds to a first priority peripheral device, the request proceeds to block 324 which grants the request. In the preferred embodiment, the block 324 corresponds to a grant for DMA Service for the peripheral device 24. If the request is not for the first priority device the request proceeds to a DRQ2 ACTIVE decision block 326. The DRQ2 ACTIVE decision block grants the request if the request corresponds to a second priority peripheral device as shown by block 328. The block 328 grants DMA service to the peripheral device 26. Finally, if the request is not for the first or second priority devices, a DRQ3 ACTIVE decision block 330 receives the request from the DRQ2 ACTIVE BLOCK 332. The DRQ3 ACTIVE block 330 grants the request if it corresponds to a third priority peripheral device (in this case the peripheral device 28). Block 334 will receive the request only if it does not correspond to one of the above ranked priority devices indicating a system error.

FIG. 10 is a table illustrating the operation of the system 10 according to the present invention. In this example it is assumed that the peripheral device 24 will be requesting a DMA read operation, while the peripheral devices 26 and 28 will be requesting DMA Write operations. According to the contention for DMA service shown on row 332, the request for the peripheral device 24 is inactive (I), while the request for the peripheral devices 26 and 28 are active (A). According to the usual priority arbitration scheme, the device 26 is granted (A) the request since the buffer 40 only has three bytes of data and is not full. Row 334 shows the next cycle of contention for DMA Service in which the device 28 is granted (A) access even though it is competing with an active (A) request from the higher priority device 26. The priority arbitration is modified since the data buffer 40 corresponding to the device 26 was full, having four bytes of data. A data transfer operation across the internal bus 22 would first be required before a transfer of data into the data buffer 40 from the device 26 can occur. On row 336, priority is granted to the device 24 since there is data in the buffer 38 which can be read by the peripheral device 24. During the next cycle of contention on row 338, the usual priority is modified so that the device 26 is granted (A) the request. The normally higher priority device 24 is not granted DMA service because it has no data in its buffer 38 which can be read out to the device without first transferring data from the system memory across the internal bus 22 to the buffer.

A latitude of modification, change and substitution is intended in the foregoing disclosure and in some instances, some features of the invention will employed without a corresponding use of other features. Accordingly, it is appropriate that the appended claims be construed broadly and in a manner consistent with the scope of the invention.

What is claimed is:

1. An input/output channel control apparatus for regulating data transfer operations, said apparatus comprising:

a data storage device;

at least two peripheral devices, each peripheral device having a predetermined priority ranking;

at least two data buffer means, each for storing data being transferred between said data storage device and at least one of said at least two peripheral devices;

means for indicating a data status of each of said data buffer means, the data status indicating whether the data buffer means are ready to handle a data transfer request;

priority arbitration means for regulating said data transfer operations by granting a data transfer request to one among contending ones of said peripheral devices requesting data transfer, based upon the predetermined priority ranking of each of said peripheral devices; and priority conditioning means coupled to said priority arbitration means for altering said predetermined priority ranking by disabling the data transfer request of a said peripheral device when the data status indicates that the data buffer means is not ready to handle the data transfer request thereby preventing said peripheral device from contending for data transfer.

2. The input/output channel control apparatus according to claim 1 wherein said data status indicating that said data buffer means is full of data, when said data transfer operation is a write operation.

3. The input/output channel control apparatus according to claim 1 wherein said data status indicates that said data buffer means is empty of data, when said data transfer operation is a read operation.

4. A data processing system, comprising:

a central processing unit;

a system memory;

a data transferring bus connecting said system memory to said central processing unit;

at least two peripheral devices, each peripheral device having a predetermined priority ranking;

an input/output channel control means connected to said data transferring bus for regulating the transfer of data between each of the at least two peripheral devices connected thereto and said central processing unit and said system memory, said input/output channel control means including a plurality of data buffer means, each for storing data being transferred to or from at least one of said at least two peripheral devices;

means for indicating a data status of each of said data buffer means, the data status indicating whether the data buffer means are ready to handle a data transfer request;

priority arbitration means for regulating said data transfers by granting requests for data transfers to one among contending ones of said peripheral devices requesting data transfer, according to predetermined priority ranking of each of said peripheral devices; and priority conditioning means for modifying said priority ranking by disabling the data transfer request of said peripheral device when the data status indicates that the data buffer means is not ready to handle the data transfer request thereby preventing said peripheral device from contending for data transfer.

5. The data processing system according to claim 4 wherein said data status indicates that said data buffer means is full of data, when said data transfer operation is a data write operation.

6. The data processing system according to claim 4 wherein said data status indicates that said data buffer means is empty of data, when said data transfer operation is a data read operation.

7. The data processing system according to claim 4 further comprising:
a peripheral bus connecting said peripheral devices to said data buffer means, and an internal bus connecting each said data buffer means to said system memory and said central processing unit.

8. A method for regulating the transfer of data between at least two peripheral devices, each peripheral device having a predetermined priority ranking and a data processing memory, comprising the steps of:
storing data for said transfer in at least two data buffers, each for storing data being transferred between said data storage device and at least one of said at least two said peripheral devices;
indicating a data status of each said data buffers, the data status indicating whether the data buffer means are ready to handle a data transfer request;
granting data transfer requests to one among contending ones of said peripheral devices requesting data transfer, according to the predetermined priority ranking of said peripheral devices; and
altering said predetermined priority ranking by disabling the data transfer request of said peripheral device when the data status indicates that said data buffer is not ready to handle the data transfer request thereby preventing said peripheral device from contending for data transfer.

9. The method according to claim 8 wherein indicating that said data buffer is full of data, when said data transfer is a data write operation.

10. The method according to claim 8 wherein indicating that said data buffer is empty of data, when said data transfer is a data read operation.

11. A method for regulating the transfer of data between at least two peripheral devices, each peripheral device having a predetermined priority ranking, and a data processing memory, comprising the steps of:
assigning a data buffer to each one of said at least two peripheral devices;
receiving data transfer requests from said peripheral devices;
storing data for said data transfer request in said data buffers assigned to said peripheral devices;
indicating the data status of said data buffers, the data status indicating whether the data buffers are ready to handle the data transfer requests;
granting data transfer requests to one among contending ones of said peripheral devices requesting data transfer according to an established priority ranking of said peripheral devices; and
altering said priority ranking by disabling the data transfer request of a peripheral device when the data status indicates that the assigned data buffer is not ready to handle the data transfer request thereby preventing said peripheral device from contending for data transfer.

12. The method according to claim 11 wherein indicating that said data buffer is full of data, when said data transfer is a data write operation.

13. The method according to claim 11 wherein indicating that said data buffer is empty of data, when said data transfer is a data read operation.

14. An input/output channel control apparatus for regulating read and write data transfer operations, said apparatus comprising:
a data storage device;
at least two peripheral devices, each peripheral device having a predetermined priority ranking;
at least two data buffer means, each for storing data being transferred between said data storage device and at least one of said at least two peripheral devices;
means for indicating when each said data buffer means is either full or empty of data;
priority arbitration means for granting data transfer request to one among contending ones of said peripheral devices requesting data transfer based upon the predetermined priority ranging of each of said peripheral devices; and
priority conditioning means coupled to said priority arbitration means for disabling the data transfer request of a said peripheral device when said corresponding data buffer means is full of data and said data transfer request is for a write data transfer from said peripheral device, and when said corresponding data buffer means is empty of data and said data transfer request is a read data transfer to said peripheral device, thereby avoiding delay in data transfer operations caused by the data status of said buffer means and thereby preventing said peripheral device from contending for data transfer.

* * * * *